(12) United States Patent
Scranton, Jr.

(10) Patent No.: US 6,379,433 B1
(45) Date of Patent: Apr. 30, 2002

(54) DEVICE FOR USE IN FILTERING CONTAMINATED AIR

(76) Inventor: Delbert C. Scranton, Jr., 14596 Whittington Ct., Chesterfield, MO (US) 63017

( * ) Notice: Subject to any disclaimer, the term of this patent is extended or adjusted under 35 U.S.C. 154(b) by 0 days.

(21) Appl. No.: 09/779,817

(22) Filed: Feb. 8, 2001

Related U.S. Application Data
(60) Provisional application No. 60/243,042, filed on Oct. 25, 2000.

(51) Int. Cl.[7] ............................................. B01D 53/04

(52) U.S. Cl. ............................ 95/135; 55/412; 55/515; 454/48

(58) Field of Search ............................ 55/385.2, 410, 55/412, 512, 515, 516; 95/135–137; 96/108, 147; 210/170, 437; 454/48; 404/25

(56) References Cited

U.S. PATENT DOCUMENTS

| | | | |
|---|---|---|---|
| 1,091,695 A | * | 3/1914 | Nolden |
| 2,959,248 A | * | 11/1960 | Thornburgh |
| 3,926,599 A | * | 12/1975 | Rudin et al. |
| 4,586,941 A | * | 5/1986 | Cooley |
| 5,620,506 A | * | 4/1997 | Ikenaga et al. ................ 96/147 |
| 5,846,274 A | | 12/1998 | Smelser |
| 5,925,241 A | * | 7/1999 | Aldridge et al. ............ 210/163 |
| 6,068,681 A | * | 5/2000 | Bourguignon ................ 95/116 |
| 6,190,440 B1 | * | 2/2001 | Purnell ......................... 96/147 |

* cited by examiner

Primary Examiner—David A. Simmons
Assistant Examiner—Frank M. Lawrence
(74) Attorney, Agent, or Firm—Polsinelli Shalton & Welte, P.C.

(57) ABSTRACT

The present invention relates to a device for use in a manhole or similar structure, whereby the device is designed to filter contaminate gas typically found in such structure. More particularly, the device includes a canister member filled with filtration media, a skirt member designed to direct contaminate gases towards the canister, and a support member for holding the canister in place.

17 Claims, 6 Drawing Sheets

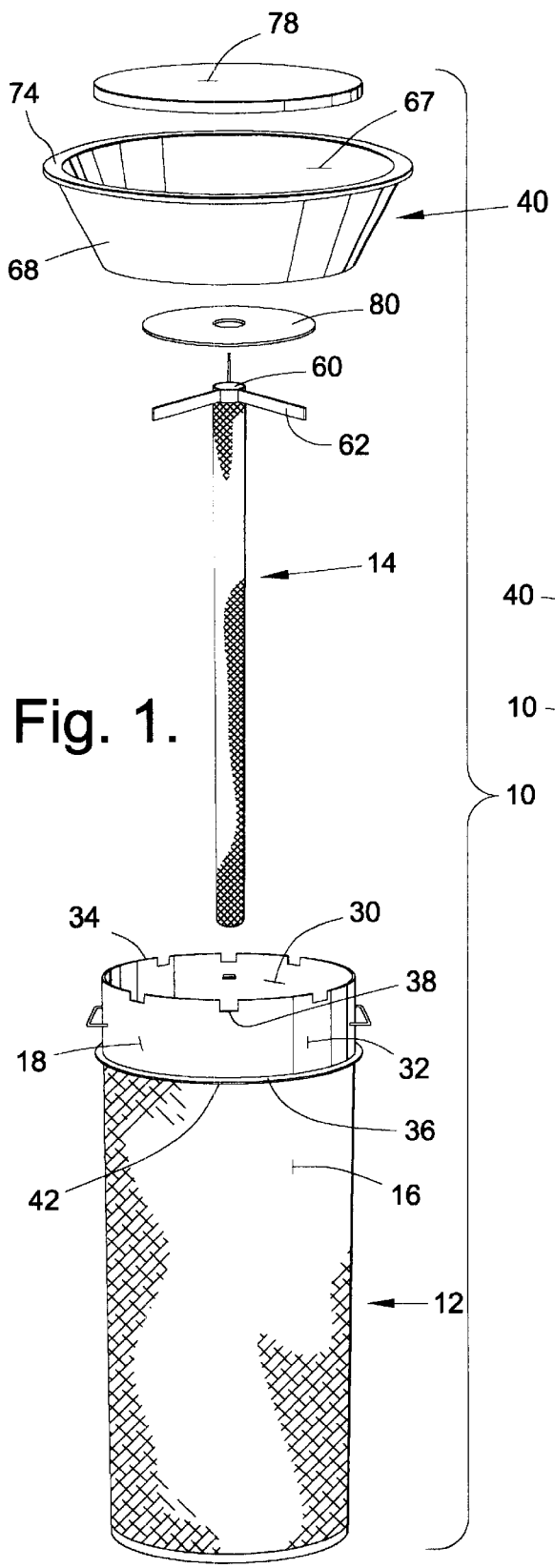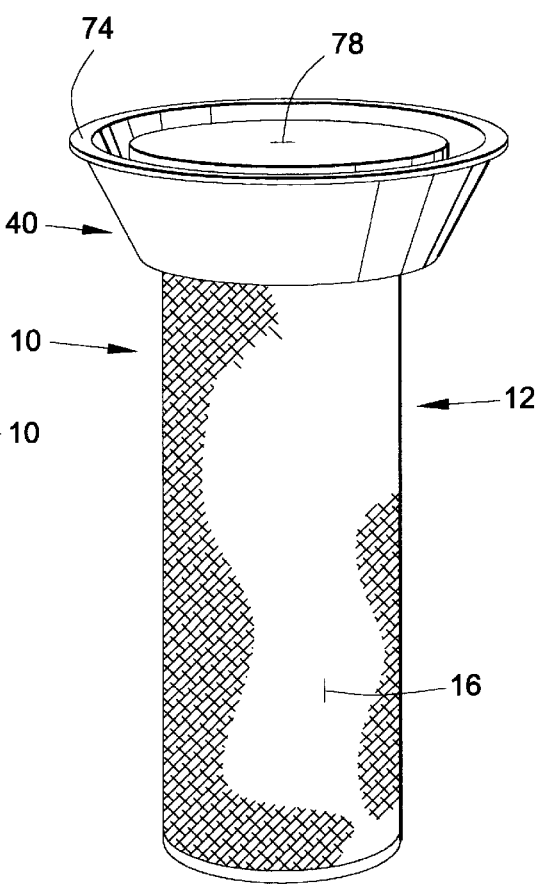

DEVICE FOR USE IN FILTERING CONTAMINATED AIR

This patent application claims the benefit of Provisional Patent Application Ser. No. 60/243,042, filed Oct. 25, 2000.

FIELD OF INVENTION

The present invention relates to a device for use in purifying air contaminated with sulfur compounds or other gaseous contaminants, whereby the device is well suited for use in a manhole or similar structure. More particularly, the present invention relates to a device for holding an amount of gas filtration media, whereby the preferred design for the device causes the contaminated air to enter through the side of the device and exit through the top of the device.

BACKGROUND OF INVENTION

Manholes, or similar structures, are used to access underground utility and sewage systems, with the manhole serving as a conduit to the surface. Often these underground systems will accumulate significant amounts of organic waste and moisture, with such conditions ideal for the propagation of bacteria. It is known that some species of bacteria that readily propagate under such conditions will metabolize organic waste. Byproducts of the metabolic process include hydrogen sulfide gas and other gaseous contaminants, which result in odors emanating from a sewer system. The odors exit through the manhole. Besides causing a foul smell, these waste products can cause corrosion of the concrete walls which form the manhole. As such, it is desired to have a method and/or device for eliminating or treating air so as to remove such gases and waste byproducts. More importantly, it is desired to have a method or device for preventing or reducing the presence of undesired odors exiting a manhole.

One method for controlling the diffusion of various odiferous gases is to seal the manhole cover to prevent the escape of the fouled air from a sewer or utility system. Sealing traps the air contaminated with the various gases in the manhole. Unfortunately, this allows for the likely buildup of methane and hydrogen sulfide, aggravates corrosion problems, and creates a hazardous environment.

In response, devices have been developed which allow for the free exchange of gases between the sewer or utility system and the surface. An example of such a device is a biofilter or activated carbon container located just below the manhole lid. It is an air permeable basket that holds filter media within the confines of the basket. The biofilter is positioned within the neck of the manhole and is typically fastened or attached to the neck. Fastening usually results from having the device bolted or attached to the wall of the manhole neck. The biofilter basket device is designed such that the contaminated air enters through the bottom of the basket and flows upward to pass through the filter media and exit the top of the basket.

The design of the activated carbon and biofilter basket device is disadvantageous for a number of reasons. For one, debris can collect in the space between the device and the manhole lid. This diverts surface water, which readily enters the manhole, to flow towards the interior of the basket. Resultingly, the water typically passes through the device. There are no means for diverting the path of the water so that the water must pass through the device. Often during a heavy rain storm, large volumes of water will pass through portions of the manhole basket device and into the sewer system. Passage of the water through the device causes the media to be washed away or ruined. Even more problematic is that the water can cause channeling within the filtration media found in the basket. Channeling decreases the effectiveness of the media by creating holes or passages through which non-filtered air can pass. The loss of media and/or media contamination prevents adequate filtering of contaminated gas by the media. The activated carbon basket filtration devices, generally, work well in dry locales, but when substantial rainfall is received, such devices are found to be inadequate. For this reason, it is desired to have a device that can be used to filter contaminated air in regions where there is rainfall exceeding that of an arid region.

Another problem is that, often, a small space is formed between the outer wall of the device and the manhole neck. Typically, not all of the air is treated because some of the contaminated air can pass through the space located between the basket and the manhole neck. For this reason, a device that inhibits the escape of non-filtered air and filters most all of the contaminated air is desired.

Devices have been developed which include a lid to divert water away from the media and a valve to allow for the escape of the diverted water. Regardless of whether fouling of the media is prevented, all filtration devices are limited generally by the amount of media they can hold. When filtering air in a manhole or similar structure, there is only a limited amount of pressure available to force or "push" the contaminated air to pass through the filtration media. Air pressure is the force that pushes the air through the media. As the air passes through the filter media a pressure drop occurs. This means the pressure decreases, causing less force to be applied to the gas or air, so that the air will pass through a limited amount of filtration media and will only travel a certain distance before there is insufficient pressure to push the air any further. If the distance of the media through which the air must pass is too great, the purified air will not easily exit the media.

Most prior art gas filtration devices are of a limited length because of concerns regarding pressure drop of air or gas. When air flows upward, it can pass through only a limited amount of filter media before a pressure drop occurs. It is desired, however, to have a device that contains a greater amount of filtration media and is of a longer length than most prior art devices. Such device, however, must be able to filter air without the attendant problems associated with pressure drop.

Other odor control devices involve placement of above ground containers outside of the manhole, either directly on top of or adjacent to the manhole. Manholes, however, are often placed in streets or other high traffic areas that do not allow for use of above ground devices. Thus, the device should be one that can be placed under the manhole cover.

As such, it is desired to have a device that can be used in all geographic regions regardless of the amount of rainfall. A device that does not allow debris trapped in the manhole neck to damage the filtration media is also desired. The device should be designed such that the media will not be washed away or channeled. Additionally, it is desired to have a device that forces all, or the majority, of the air to be filtered by the media so that the contaminated air does not flow around the sides of the device. Another desire is to have a system that can hold a comparatively significant amount of media. It is further preferred if devices for use in a manhole can have a longer construction. Most importantly, it is desired to have a device whereby a pressure drop is not a concern, and whereby exhaust gas from the sewer and air from the outside easily flows through the device.

SUMMARY OF INVENTION

The present invention relates to a device designed and dimensioned for holding an amount of media for use in filtering contaminants from air. More preferably, the present invention relates to a device for use in a manhole or similar structure, whereby the device can be placed in the manhole and used to filter air contaminated with sulfur and other contaminants found in a sewer or similar system.

The filtration device can have a variety of different constructions as long as an amount of filtration media can be held so that contaminated air can be filtered. A preferred construct results in the air following an S-shaped path during the treatment process. As the contaminated air collects in the manhole, pressure increases which in turn pushes the contaminated air upward and then horizontally through the filtration media. The present invention is designed so that instead of the air flowing in a continues upward path, it flows in a horizontal path (of relatively short duration) through the filtration media. This is advantageous because more filtration media can be placed in the device without increasing pressure drop. Essentially, the air follows a path that is S-shaped so that the air flows vertically, then horizontally, and finally vertically. This construction causes the contaminated air to travel over the filter media according to a reverse radial flow path. In the present case, radial flow means the air to be filtered travels in a substantially horizontal path, from the outside inward.

The filtration device will include a member for holding the filtration media, with the member being substantially air permeable. The contaminated air passes through an air permeable member wall and contacts the filtration media held by the member. Located within the member will be an air permeable conduit, which permits the escape of the air after it has been filtered. The conduit forms a channel through the filtration media, which allows for the purified air to exit. The filtration media will occupy the space between the wall and the conduit. Importantly, the member has a construction that allows for the contaminated air to be purified by passing over and through the filtration media, with the purified air then exiting through the conduit and out of the device. The member must further be of a construction whereby a significant pressure drop does not occur as the air passes through the media so as to allow the purified air to reach the conduit and exit the device. The member, as well as the device, in total, can be of any size, as long as air is filtered.

The present device is preferably used in a manhole or similar contained structure. The preferred construction of the filtration device is a cylinder-shaped member having a gas permeable wall and the conduit located within the member. The cylinder-shaped member preferably has a bottom that can be opened and closed. An annular collar is preferably integrally attached to the cylindrical-shaped member opposite the bottom. It is further preferred for the bottom portion of the filtration device to be of a solid, non-gas permeable construction. The bottom portion is attached to the cylinder member and closes the device, with it desired for the bottom to be hinged so it can be opened and closed.

To support the filtration device in the manhole, it is preferred to use a tub design to hold the filtration device in an elevated position. Preferably, the filtration device includes outward extending tabs or an annular ring, which will be receivably held by an inward extending annular ring or tabs affixed to the tub. Oppositely, the tub will then be supported by the lip of the manhole, whereby the tub has an outward extending member, which is received and held by the lip of the manhole.

The present invention is advantageous because it allows for reverse radial flow treatment of contaminated air (out) and outside air (in). It is also advantageous because it can hold a greater amount of media than most similar devices. There is less concern regarding a pressure drop when the air is being filtered because the design of the present device does not result in the air having to travel comparatively long distances over the media. The device is further advantageous because it is not subject to damage or media malfunction as a result of a rain storm. The device is also advantageous because it can be readily adjusted and easily removed and reset. Finally, the device is advantageous because it is well suited for use in a manhole.

BRIEF DESCRIPTION OF THE DRAWINGS

FIG. 1 is a side cross-sectional view of a gas filtration device prior to assembly, with the lid, tub, conduit member, and media basket member all shown;

FIG. 2 is a side view of the assembled gas filtration device;

DETAILED DESCRIPTION OF THE INVENTION

Figure 3:
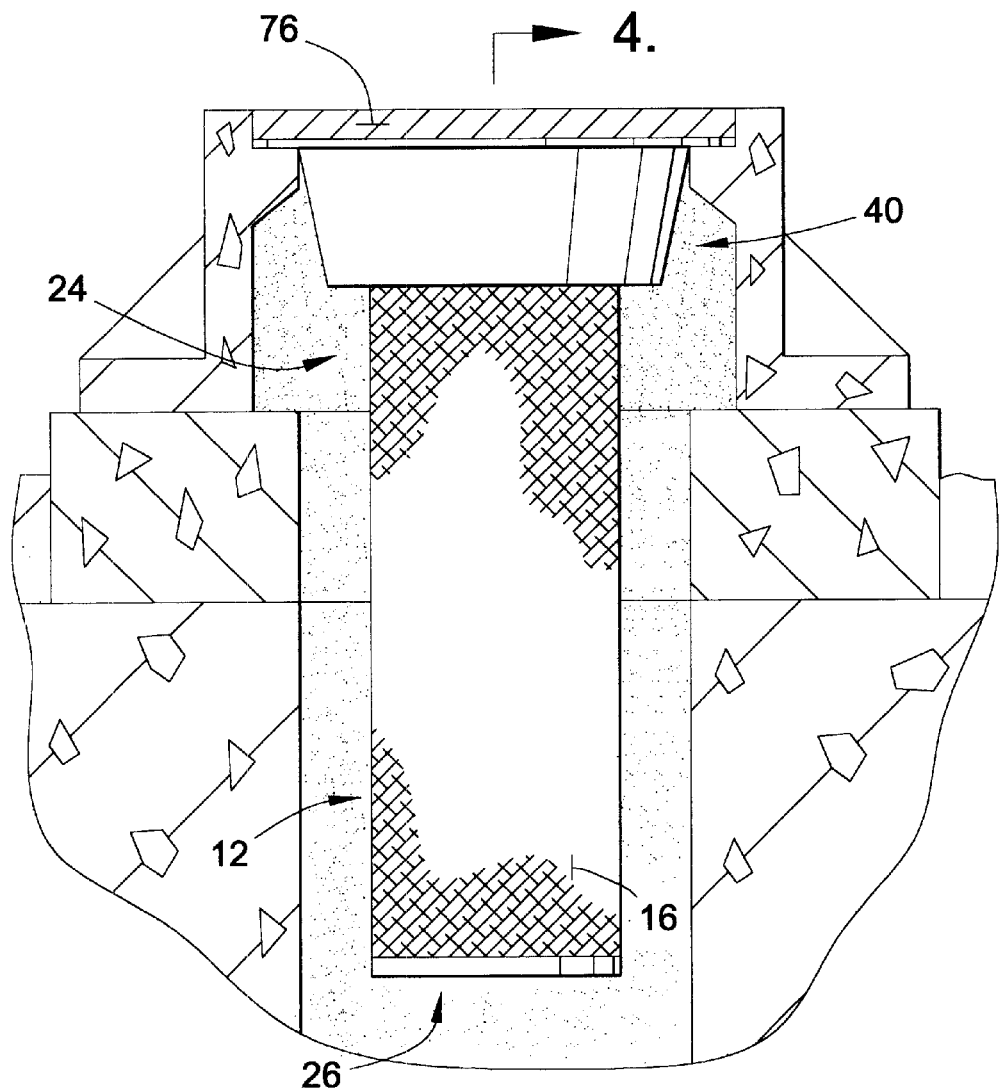
FIG. 3 is a side view of the gas filtration device in use in a manhole.
Figure 10:
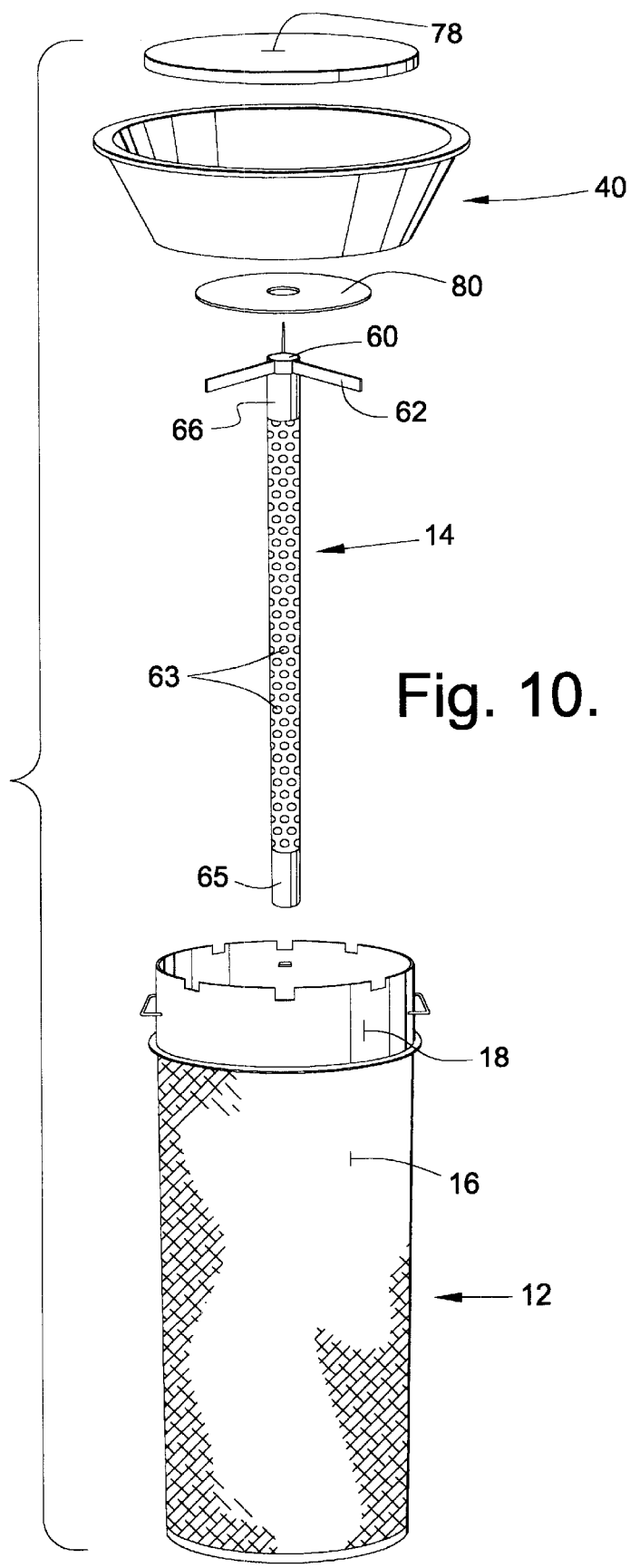

The present invention relates to a filtration device 10, shown in FIGS. 1 and 2, for use in purifying contaminated air, with the filtration device 10 designed and dimensioned for holding an amount of filter media. The gas filtration device 10 includes a gas permeable member 12 that holds an amount of the filtration media, whereby contaminated air passes through and is filtered by the media found in such member 12. The gas permeable member 12 is shown in FIGS. 1 and 10, and must be air permeable to allow for the entry of the contaminated air. Further, the gas permeable member 12 should be of a sufficient size to hold an amount of filtration media sufficient to substantially eliminate gaseous contaminates found in the air. Located in the gas permeable member 12 will be a conduit member 14 which forms a channel through the media. The conduit member is also shown in FIGS. 1 and 10. The channel formed by the conduit 14 allows air that has been filtered to flow upward and to exit the filtration device, with the air flow illustrated in FIG. 4. Preferably the filtration device 10 has a construction that allows it to be easily placed in and removed from a manhole or similar structure, with such placement shown in FIGS. 3, 4, and 5. Preferably, the gas filtration device 10 is mounted in a manhole, or similar narrow tubular like structure, where contaminated air has been observed to collect.

It is preferred that the media for use in the device 10 remove sulfur gas, especially $H_2S$; however, media for removing other gaseous contaminants from air may also be used. The filtration device 10 is especially well suited for use in association with a sewer system or any other confined underground area, accessed via a manhole, where organic waste and moisture collect to produce air contaminated with sulfur gas and other contaminant gaseous compounds.

Figure 4:
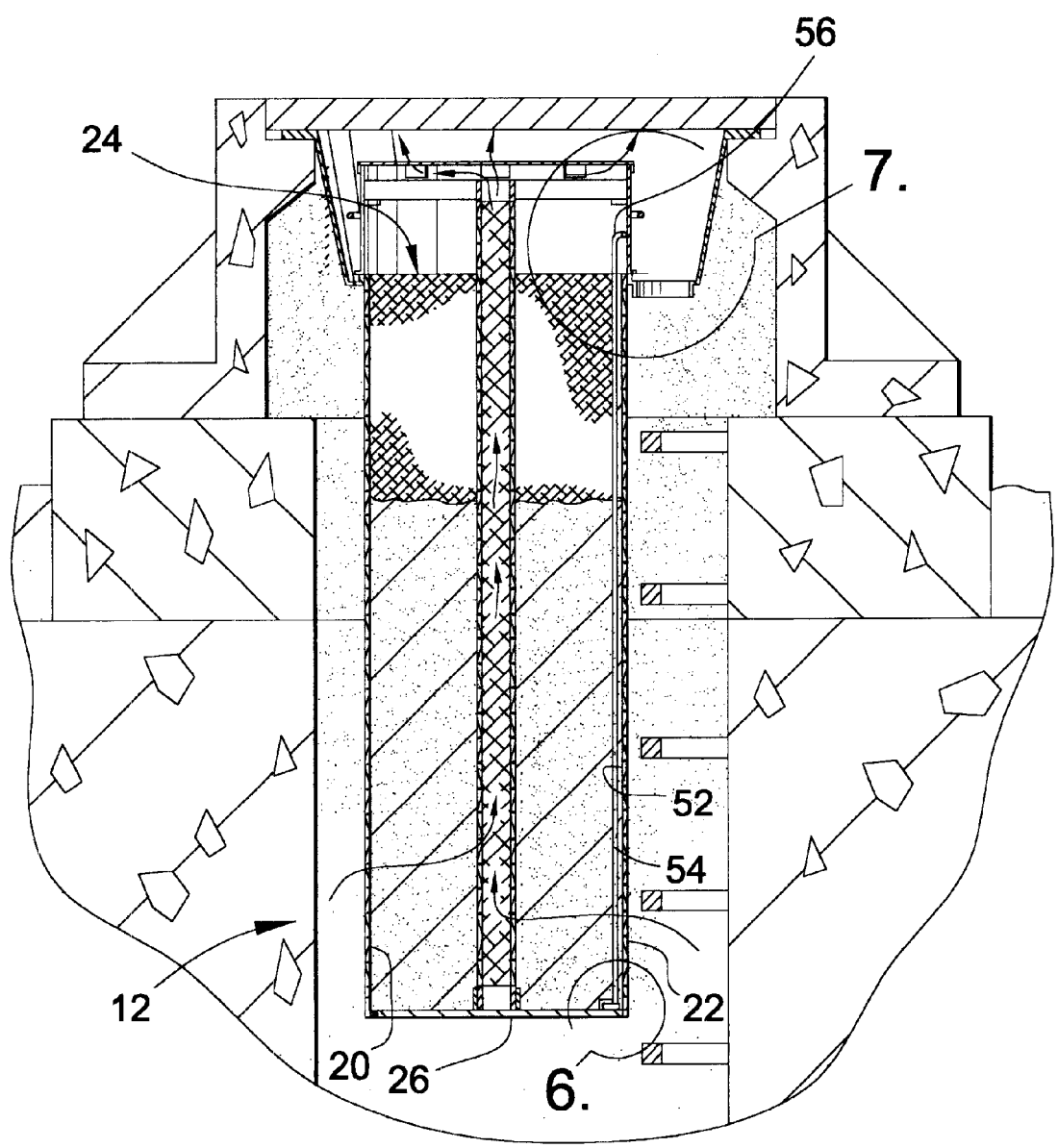
FIG. 4 is a cutaway side view of the gas filtration device in a manhole, with the flow of the air shown.
Figure 5:
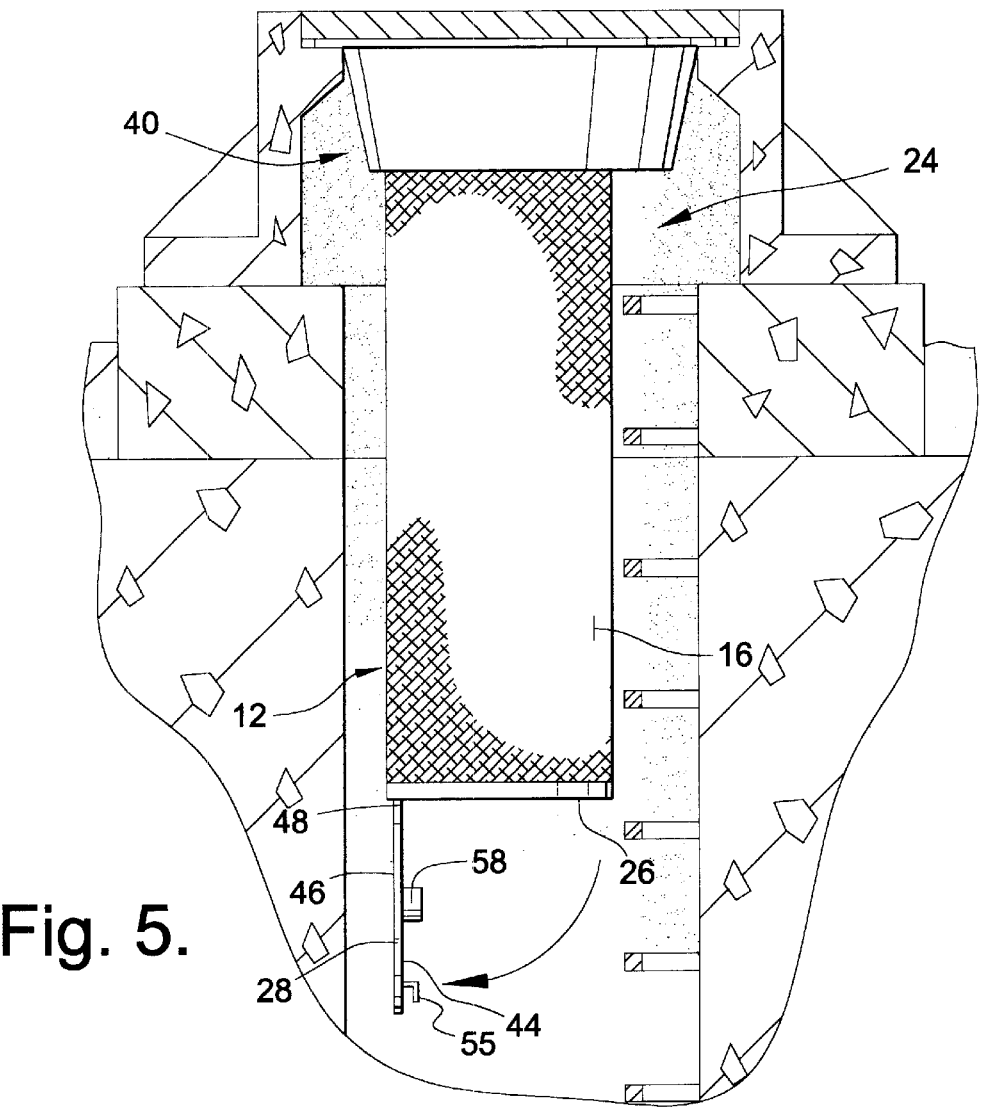
FIG. 5 is a side view of the gas filtration device in a manhole, with the bottom member of the gas filtration device disengaged.

The gas permeable member 12, also known as a media basket, is designed and dimensioned to hold the filtration media and can be of a variety of sizes and shapes. The media basket 12 includes a basket member 16, which holds the filter media, and may include a collar 18. Generally, the basket member 16 will have a wall 19 having an inner surface 20 and an outer surface 22, a top portion 24 and a bottom portion 26, with the top being open, all shown in FIG. 4. The basket member 16, however, can have a variety of shapes and be of a variety of different sizes. Included among the available designs are: a basket or cup-shaped member having only a top opening; a cylinder having opposed openings located at the top and the bottom; a cylinder having a closed bottom end so that the bottom is integral with the rest of the cylinder; a frusta-conical member with either an open or closed bottom end; a rectangle with an open or closed bottom end; as well as, a variety of other shapes and designs. But, it is most preferred if the basket member 16 has a cylindrical construction with an opening near the top portion 24 and a bottom portion member 28 that can be opened and closed. FIG. 5 illustrates a bottom portion member 28 that opens and closes. The cylindrical shape is well suited for placement in a sewer manhole or similar type of structure because it has a shape similar to the shape of the structure into which it is inserted.

The cylindrical shaped basket member 16 has an inside surface 20 and an outside surface 22, which together form a wall 19. The wall 19 will be formed substantially from an air or gas permeable material and will have a construction that allows air or gas to pass through the wall 19 while still holding the media within the confines of the basket 16. More preferably, the basket 16 is comprised of a metal mesh or similar type of material. As before, the mesh size should be such that the filtration media particles do not easily pass through the mesh. An alternative construction is to have a solid wall with a plurality of holes drilled therethrough. The holes, however, must be of a small enough diameter to prevent the escape of the media. The basket 16 should be made from corrosion resistant material. Stainless steel mesh or a coated metal is most preferred but, in the alternative, fiber reinforced plastic may be used. The cylindrical shaped basket member 16 will have a diameter that ranges between 12 inches and 72 inches, and a length ranging between 18 inches and 144 inches and, more preferably, the diameter ranges between 12 inches and 36 inches, and the length ranges between 18 inches and 72 inches.

The media basket 12 will preferably include a collar 18 located near the top portion 24 of the basket member 16 and a bottom portion member 28 located opposite the collar 18. Preferably, the collar member 18 has a shape similar to the basket member 16. As such, it is preferred if the collar member 18 has an annular shape. The collar member 18 will have an inner wall 30 and an outer wall 32, as well as a top edge 34 and a bottom edge 36. The bottom edge 36 is affixed to the basket member 16, with it preferred for the collar 18 to be integrally connected to the basket member 16. Extending downward from the top edge 34 of the collar 18 will be at least one notch 38 or clip. Such notch 38 allows for the purified air that has passed through the filtration media to escape and exit the gas filtration device under lid 78. The air passing through the notch is illustrated in FIG. 4. It is more preferred if there are a plurality of notches 38. The area of notches 38 should equal an area greater than the equivalent area of the conduit member 14 located within the basket 16. Alternatively, holes can be cut into the collar to allow the air to exit. A different alternative would use lid-elevating supports to allow air to escape.

The collar 18 is also used to help support the conduit member 14. This is important to prevent the conduit 14 from falling out of the filtration device 10 when the bottom portion member 28 is opened. The collar 18 preferably will have a lip, tab, or ring 42 that projects away from the inside wall 30, where a member for supporting the conduit member 14 can be received. Means other than the collar may be used to support the conduit member. It is preferred, however, if the collar is designed and dimensioned to support the conduit member.

The collar member 18 is designed to provide a surface or platform from which a system or means for holding the gas filtration device 10 in an elevated position can be attached or received. Attached to the collar 18 will be a member, device, or system for holding and supporting the filtration device, which is oppositely affixed to, held by, or received by a part of the manhole lip. Specific ways in which the filtration device 10 can be supported in an elevated position include: the collar 18 being received and held by a tub 40, which is, in turn, received and held by the manhole; chains being affixed on one end to the collar 18 and on an opposite end to the manhole wall; bolts attached on one end to the wall and designed to receive the collar 18 on an opposite end; or, similar members being affixed to the collar and the manhole wall or structure in which the device 10 is mounted. Any of a variety of devices or means of holding the gas filtration device 10 in an elevated position may be selected, as long as the filtration device 10 can be held and supported in an elevated position. The collar 18, however, is not necessary to ensure the device 10 is held in position. Alternatives may be used, as long as the filtration device 10 can be held in an elevated position. Thus, members other than the collar 18 may be used as long as the gas filtration device 10 has means for attachment to a support structure and the purified air can exit the top portion of the device.

The collar 18 is also used to help support the conduit member 14. This is important to prevent the conduit 14 from falling out of the filtration device 10 when the bottom portion 28 is opened. The collar 18 preferably will have a lip, tab, or ring 42 that projects away from the inside wall 30, where a member for supporting the conduit member 14 can be received. Means other than the collar may be used to support the conduit member. It is preferred, however, if the collar is designed and dimensioned to support the conduit member.

Attached to the basket 16 opposite the annular collar 18, will be a bottom portion member 28, which closes or seals the cylindrical basket 16 to form a cup shaped device. The bottom portion member 28 is preferably of a solid uniform construction and not formed from a gas permeable or mesh material. The bottom portion member 28 has opposed faces, an inner face 44 and an outer face 46, shown in FIG. 5. The inner face 44 contacts the filtration media. Importantly, the bottom portion member closes the basket 16 and prevents the filtration media from falling through the device. It is preferred if the bottom portion member 28 can be opened and closed. Alternatively, the bottom portion member 28 can instead be fixedly attached to the basket member 16. Such attachment may result in the basket member 16 being integral with the bottom portion member 28. The bottom portion member 28, however, is preferably attached to the basket 16 by a hinge member 48 affixed to the inner surface 20 of the basket member and the inner face 44 of the bottom portion member. A latch mechanism 50 is located on the side of the bottom portion member opposite the hinge member 48. Other means for opening and closing the bottom may be instead used.

Figure 6:
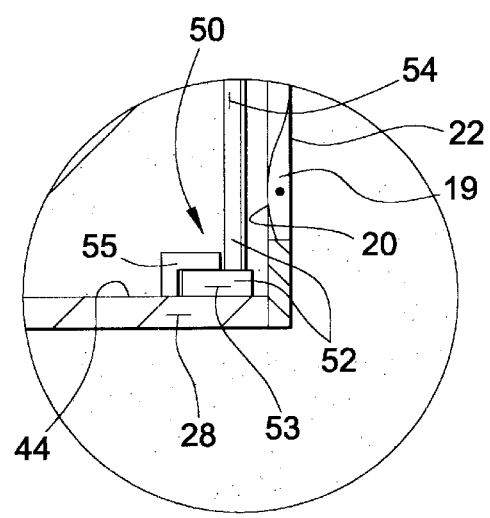
FIG. 6 is an exploded side view of latch mechanisms used to open and close the bottom.

The latch mechanism 50, shown in FIG. 6, is comprised of an L-shaped latch member 52, having a tongue 53 and a rod 54 with the tongue 53 receivably contacting an L-shaped member 55 attached to the inner face 44 of the bottom portion member 28. The L-shaped member 55 has a foot, which receivably contacts the tongue 53. The latch member 52 can be actuated from a position where it holds the bottom portion member 28 in a closed position to an open position, whereby the bottom portion member 28 swings open on the hinge 48. When closed, the bottom portion member 28 helps hold the filtration media within the basket 16. The latch member 52 is designed so that it can be actuated near the top of the filtration device to cause the bottom portion member to open. Thus, the latch member 52 includes the tongue 53 and a rod 54 that extends the length of the basket member 16, with the rod 54 extending from the inside wall 30 of the annular collar 18 and downward to the bottom portion member 28. At the top, it is preferred for the rod 54 to be integrally attached to a handle 56, shown in FIG. 4. The rod 54 is curved at the bottom end to form the tongue 53, opposite the collar 18, and is received by the foot of the L-shaped member 55 affixed to the inner face 44 of the bottom portion member 28. The L-shaped member 55 can include a depressible member located in the foot to inhibit the rod 54 from moving. When actuated, the tongue 53 will turn and separate from the foot to, in turn, cause the bottom portion member 28 to be released. This is advantageous because instead of having to lift a gas filtration device 10 with a large quantity of gas filtration media out of a manhole, the latch member 52 can be actuated to cause the media to be spilled onto the ground and out of the gas filtration device. Releasing the filtration media makes the device 10 lighter. This makes the gas filtration device easier to handle and allows for it to be easily removed from a sewer or manhole. It is preferred if the bottom portion member 28 is of a solid construction and not a mesh construction.

Preferably, the inner face 44 has a cup-shaped member 58, shown in FIG. 5, attached thereto, whereby the cup-shaped member 58 is designed and dimensioned to receive the conduit member 14. The cup-shaped member 58 has an annular construction, because it will be the same shape as the conduit member 14. Inclusion of the cup-shaped member is done to ensure the conduit member 14 is supported and centered. Other constructions may be used as long as the conduit member 14 can be received and preferably held by the alternative construction.

A conduit member 14, as mentioned above, is located within the media basket 12. The conduit member 14 is designed to create a vertical channel within the media basket 12 that extends from near the bottom portion 26 of the basket member 16 to the top portion 24. Importantly, the conduit member 14 allows for reverse radial flow treatment of the contaminated gas. This means the contaminated air enters through the side of the device 10 and moves in a horizontal direction across the filtration media. The purified air then exits through the conduit member 14. Once the air enters the conduit member 14, it flows upward and exits the device 10. This is done so that more filtration media can be held by the media basket 12 and the media basket can be of a longer construction. Without the conduit member 14, there would be too much filtration media through which the air must pass, as such excess pressure would be required to cause the purified air to exit. When air must pass through too much media, a pressure drop occurs, which inhibits the purification of the contaminated air and results in the purified air being prevented from migrating to the surface.

The conduit 14 also allows air to pass into a sewer system. Air can enter the manhole and pass through the conduit in a direction opposite the contaminated air. This allows the sewer system to "breathe."

The conduit member 14 can be of a variety of circumferences and shapes, as long as a channel is formed that allows the purified air to flow upward to exit. Also, the conduit member 14 must be air permeable. Preferably, the conduit member 14 has a cylindrical construction, whereby a cylinder or rod shaped member is formed. Other shapes, such as an elongated square, rectangle, or triangle, however, can be used.

It is desired for the conduit member 14 to be removably attached to the collar member 18 or top of the media basket 12. Attachment to the collar 18 is designed to prevent the conduit 14 from falling out of the basket when the bottom portion member 28 is opened. This can be achieved by using a hub and spoke arrangement, a line member (such as a chain), or any other device or member that can be connected on one end to the conduit member 14 and on the opposite end to a part or member of the gas filtration device 10. It is preferred if integrally attached to the top of the conduit member is a hub 60 which will have at least two legs or spokes 62 extending radially outward. It is more preferred to have three legs. The legs 62 are received by a ledge, or tabs, 64 located on the inner wall 30 of the annular collar 18. Such ledge 64 supports the conduit member 14 within the media basket 12. Alternatively, the conduit member 14 can be placed in the media basket 12 without any support.

The conduit member 14 will be made out of the same metallic mesh material as the media basket 12. Alternatively, the conduit member 14 can have a solid wall construction with a plurality of holes 63 drilled therethrough shown in FIG. 10. Any material can be used that is air permeable and creates a channel through the media. Most preferably, the conduit member 14 has a solid wall 65 near the bottom and a solid wall near the top 66, with the remainder of the conduit being formed from a solid material having holes 63 drilled therethrough. The conduit 14 preferably has a diameter equal to between 1 inch and 4 inches, and a length ranging between 18 inches and 72 inches. Also, if the bottom is air permeable, then the conduit will not contact the bottom and will be at least three (3) inches from the bottom.

It is preferred if the radius between the inside wall of the basket member 16 and the conduit 14 ranges between 3 inches and 24 inches. This is a distance suitable to achieve filtration of contaminated gas without a pressure drop resulting that prevents the exit of the purified air. It is also preferred if the conduit 14 is centered within the media basket 12.

It is preferred to position the filtration device 10 in a manhole or similar confined area. It is more preferred for the device to be suspended above the area from where the contaminated air emanates. This is because, typically, the contaminated air rises so that to achieve the most effective purification, the device needs to be located above the contaminated air source. Thus, the filtration device 10 is placed preferably in the neck of the manhole. Also, if the device is located too close to the floor, it can be damaged by water rising in the system.

As mentioned previously, any of a variety of ways can be used to support the filtration device in an elevated position in the manhole. The collar member 18 can be affixed to or received by a number of different structures. Keep in mind that a collar 18 is not required, as the support structures can, instead, be affixed to or receive the basket member 16 instead of the collar 18. A preferred way to hold the gas filtration device 10 in an elevated position is to position the device in a tub 40, which receives and holds part of the collar member 18. The tub 40 is held or supported by the lip of the manhole wall. The tub has an inside wall 67 and an outside wall 68, with the inside wall 67 having an inward extending lip 70, shown in FIGS. 7 and 8. Such lip 70 is designed and dimensioned to receive an annular ring 42 located on the annular collar of the media basket 12. The annular ring 42 is received and held by the inward extending lip 70 in an abutting relationship to thereby hold the media basket in place as shown in FIG. 4. Alternatively, tabs may be affixed to the annular collar 18 instead of an annular ring 42. The tabs, similar to the ring, will form an abutting relationship with the lip 70.

Figure 7:
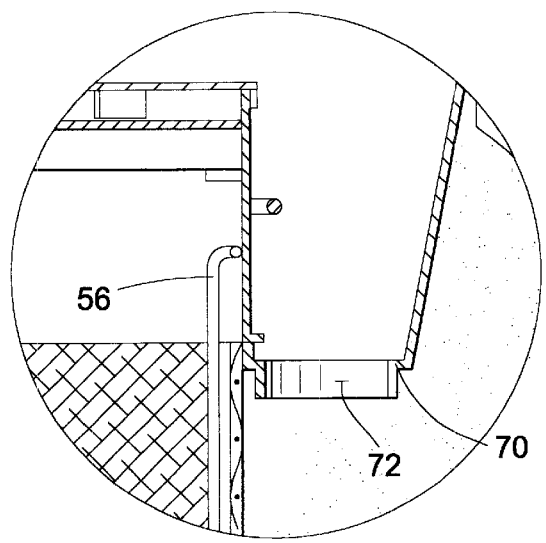
FIG. 7 is an exploded side view of the top portion of the gas filtration device, with the water release valve of the tub shown.
Figure 8:
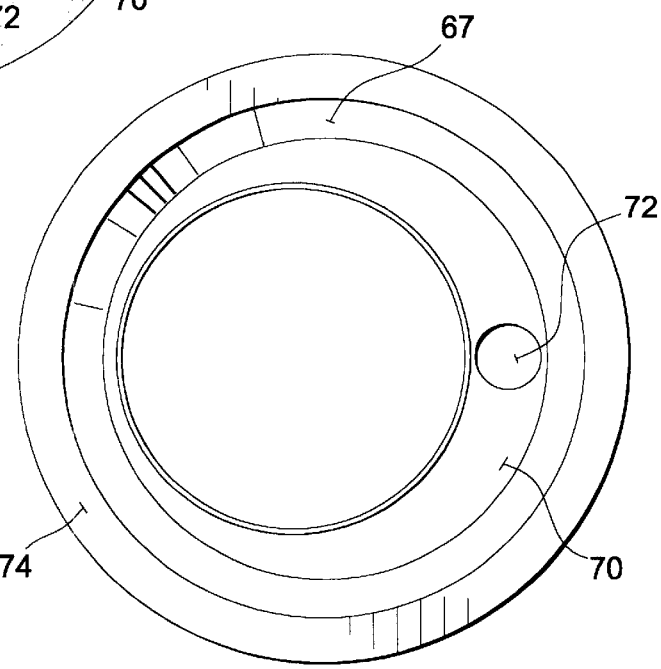
FIG. 8 is a top view of the tub of the gas filtration device, with the lid placed over the basket member.
Figure 9:
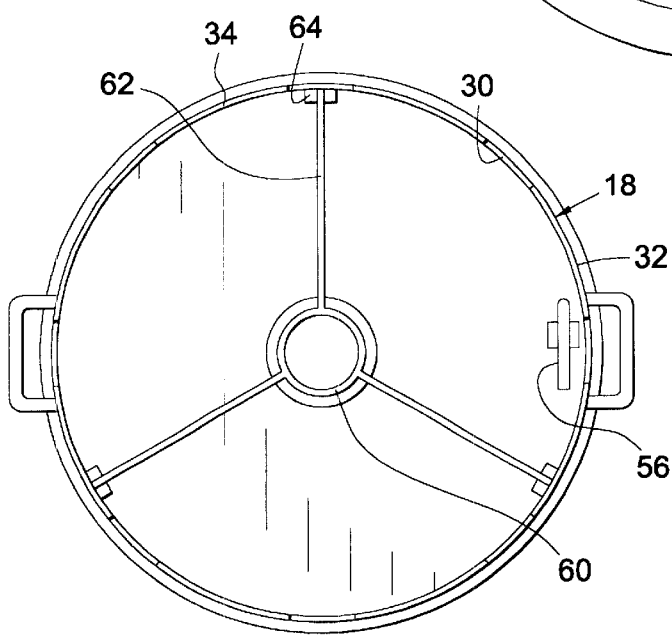
FIG. 9 is a top view of the conduit member located in the media basket of the gas filtration device; and, FIG. 10 is a side cross-sectional view of a gas filtration device prior to assembly, with the lid, tub, conduit member, and media basket member all shown.

It is further preferred if the inward extending lip 70 has a water release valve 72, shown in FIGS. 7 and 8, so that when water enters the device instead of the water passing through the filtration media, it will be released through the water release valve 72. It is preferred if the water release valve 72 has a screen member, or similar construction, to prevent debris from collecting within the valve.

The lip 70 is preferably of a varying width. If the width is greater on one side than on the other, then the media basket 12 can be offset so that it is closer to one side of the manhole than the other. This permits the media basket to avoid the steps, which are typically found in a manhole and shown in FIGS. 4 and 5. Thus, the lip 70 will be of a varying diameter.

The inside wall 67 of the tub 40 is angled inward from the top so that the lip 70 does not have to be as wide. As such, the tub 40 will have a frusta-conical shape. The inside wall 67, however, can be angled or straight dependent upon the manhole. Angled is also preferred to avoid objects extending outward from the manhole wall.

Preferably, the tub 40 will also have a ledge 74 extending outward from the outside wall 68, with such ledge 74 designed and dimensioned to be received by a manhole lip or ledge. In place of the ledge, tabs may be used on the tub. The ledge 74 is located opposite the inward extending lip 70 near the top of the tub 40. As such, the ledge 74 will abut the manhole lip, with the manhole cover 76 fitting thereover, holding the tub in place, shown in FIGS. 3 and 4. Such a construction allows the gas filtration device 10 to be suspended. It should be noted, however, that other constructions may be used, as long as the gas filtration device is suspended in such a position as to allow gas filtration to occur without loss of substantial amounts of gas filtration media. The tub 40 can be made of any corrosion resistant material that can support a significant amount of weight. Stainless steel is the most preferred material. The tub 40 will have a length equal to between 6 inches and 18 inches. Also, the tub 40 will have a diameter equal to between 18 inches and 48 inches. Tub 40 may be constructed in any shape, such as square, rectangle, or triangle.

It is preferred to include a lid 78 that fits over the collar 18. Such lid 78 deflects water and other debris from entering into or contacting the filtration media. The lid 78 can be made from any of a variety of materials, including plastic or stainless steel.

The filtration device can include a vapor barrier 80, shown in FIGS. 1 and 10. The vapor barrier 80 is a sealing member designed to prevent the escape of air prior to treatment. Because of the vapor barrier 80, air to be treated must pass through the conduit 14. The vapor barrier 80 can be made from any of a variety of materials, including flexible plastic.

Any of a variety of different types of filtration media can be placed in the filtration device 10. The media will be selected based on the particular contaminates desired to be removed or filtered. Generally, any of a variety of different medias can be used, including, but not limited to, metal oxides, compost, solid oxidizing media, organic odor counteractants, and activated and impregnated carbon or compatible combinations thereof.

An alternative construction will use two different kinds of media, with the media segregated within the filtration device. A gas permeable wall member can be located between the conduit member and the media basket. The wall will keep the media separate.

Thus, there has been shown and described a device and method for filtering gas found in a manhole or similar structure which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

What is claimed is:

1. A filtration device for holding an amount of filtration media and for use in filtering contaminated air, comprising:
   (a) a media basket comprised of a collar and a basket member, said collar having an inner wall and an outer wall, a top portion and a bottom portion, and at least one notch located near said top portion, said basket member attached to said bottom portion of said collar, whereby the filtration media is held in said basket member, said basket member being gas permeable to allow for entry of the contaminated air;
   (b) a conduit member located within said media basket, which extends substantially lengthwise within said media basket, said conduit member forming a vertical channel within the filtration media and whereby said conduit member is air permeable; and,
   (c) a tub having an inside wall and an outside wall, and having an open top and bottom, said tub designed and dimensioned to receive and hold said media basket, wherein said media basket includes a lid that fits over said annular collar of said media basket.

2. The filtration device of claim 1, wherein said collar is made of a corrosion resistant material.

3. The filtration device of claim 1, wherein said basket member is at least 1.5 feet in length and of a cylindrical shape.

4. The filtration device of claim 1, wherein attached to said basket member opposite said collar is a bottom member.

5. The filtration device of claim 4, wherein said bottom is hinged and can be opened and closed.

6. The filtration device of claim 1, wherein said collar includes an annular ring that extends outward from said collar outer wall.

7. The filtration device of claim 6, wherein said tub has an inward extending lip attached to said tub inside wall designed to allow said annular ring to rest thereon.

8. The filtration device of claim 7, wherein said tub includes a water valve located on said inward extending lip.

9. The filtration device of claim 1, wherein said collar has an annular shape.

10. The filtration device of claim 1, wherein said basket member is made of metal mesh.

11. The filtration device of claim 1, wherein a hub is attached to said conduit member, said hub having at least two legs extending radially outward, said legs received and held by a member on said collar inner wall.

12. The filtration device of claim 1, wherein said tub has a ledge extending outward from said outside wall.

13. The filtration device of claim 1, wherein said tub has a frusta-conical shape.

14. The filtration device of claim 1, wherein said basket member has a cylindrical shape and is closed at one end.

15. The filtration device of claim 1, wherein said device includes a vapor barrier.

16. A filtration device for use in a manhole that allows for radial treatment of contaminated air, comprising:
 (a) a media basket comprised of an annular collar and a basket member, said annular collar having an inner wall and an outer wall, a top portion and a bottom portion, and at least one notch located near said top portion, said collar includes a support member that extends outward from said annular collar outer wall, said basket member is attached to said bottom portion of said collar, where said basket member is cylindrically shaped and closed at an end opposite said annular collar, said basket member is made of a gas permeable material;
 (b) a conduit member located within said media basket, which extends lengthwise within said media basket, said conduit forms a vertical channel, said conduit member is air permeable and has a top and bottom, with a hub attached to said conduit member top, said hub having at least two legs extending radially outward, said legs received by said collar inner wall so that said conduit member is located within said media basket and held by said collar; and,
 (c) a tub having a frusta-conical shape and open at both ends, said tub designed and dimensioned to receive and hold said media basket, whereby said tub has an inside wall and an outside wall, an inward extending lip attached to said tub inside wall designed to allow said collar ring to rest thereon, and a ledge extending outward from said outside wall.

17. A method for purifying air contaminated with sulfur and found in a manhole, whereby said method comprises:
 (a) placing sulfur reactive media in an air filtration device;
 (b) placing said air filtration device in the manhole, whereby the filtration device comprises;
  (i) a media basket comprised of a collar and a basket member, said collar having an inner wall and an outer wall, a top portion and a bottom portion, and at least one notch located near said top portion, said basket member attached to said bottom portion of said collar, said basket member being gas permeable to allow for entry of the contaminated air;
  (ii) a conduit member located within said media basket, which extends substantially lengthwise within said media basket, said conduit member forming a vertical channel within the filtration media and whereby said conduit member is air permeable; and,
  (iii) a tub having an inside wall and an outside wall, and having an open top and bottom, said tub designed and dimensioned to receive and hold said media basket.

* * * * *